United States Patent
Kotary et al.

(10) Patent No.: US 9,858,412 B2
(45) Date of Patent: Jan. 2, 2018

(54) SECURE TRUSTED EXECUTION ENVIRONMENT DATA STORE

(71) Applicants: Karunakara Kotary, Portland, OR (US); Rajesh Poornachandran, Portland, OR (US); Scott D. Brenden, Hillsboro, OR (US); Vincent J. Zimmer, Federal Way, WA (US)

(72) Inventors: Karunakara Kotary, Portland, OR (US); Rajesh Poornachandran, Portland, OR (US); Scott D. Brenden, Hillsboro, OR (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 14/749,856

(22) Filed: Jun. 25, 2015

(65) Prior Publication Data

US 2016/0378976 A1    Dec. 29, 2016

(51) Int. Cl.
*G06F 21/53* (2013.01)
*G06F 21/57* (2013.01)
(Continued)

(52) U.S. Cl.
CPC .......... *G06F 21/53* (2013.01); *G06F 3/0623* (2013.01); *G06F 3/0655* (2013.01);
(Continued)

(58) Field of Classification Search
CPC ...... G06F 3/062; G06F 12/14; G06F 12/1408; G06F 21/57; G06F 21/572
See application file for complete search history.

(56) References Cited

U.S. PATENT DOCUMENTS

| | | | |
|---|---|---|---|
| 6,401,183 B1 * | 6/2002 | Rafizadeh | G06F 3/0605 711/170 |
| 2005/0120145 A1 * | 6/2005 | Andres | G06F 13/102 710/8 |

(Continued)

FOREIGN PATENT DOCUMENTS

WO    WO 2016/018378    *    7/2014

OTHER PUBLICATIONS

International Search Report and Written Opinion for International Patent Application No. PCT/US2016/033706, mailed on Aug. 29, 2016, 13 pages.

(Continued)

*Primary Examiner* — Khang Do
(74) *Attorney, Agent, or Firm* — Jordan IP Law, LLC (57) ABSTRACT

Systems, apparatuses and methods may provide for receiving, from a host driver, factory data including one or more of calibration data, platform identifier data, manufacturer data or wireless carrier data, and verifying integrity of the factory data. Additionally, the factory data may be provisioned into non-volatile memory (NVM) in accordance with an operating system independent format managed by a platform root-of-trust such as a Trusted Execution Environment (TEE). In one example, provisioning the factory data includes defining one or more partitions in the NVM, initiating storage of the factory data to the NVM along the one or more partitions, and specifying a restriction profile for the one or more partitions, wherein the restriction profile includes one or more of read restrictions, write restrictions, time bound restrictions or location bound restrictions.

20 Claims, 6 Drawing Sheets

(51) Int. Cl.
  *G06F 12/14* (2006.01)
  *G06F 3/06* (2006.01)

(52) U.S. Cl.
  CPC ........ *G06F 3/0679* (2013.01); *G06F 12/1408* (2013.01); *G06F 21/572* (2013.01); *G06F 2212/1052* (2013.01); *G06F 2221/2111* (2013.01)

(56) References Cited

U.S. PATENT DOCUMENTS

| | | | |
|---|---|---|---|
| 2005/0270855 A1* | 12/2005 | Earhart | G11B 20/1217 365/189.05 |
| 2006/0101310 A1* | 5/2006 | Diamant | G06F 21/12 714/38.14 |
| 2007/0113266 A1 | 5/2007 | Ross et al. | |
| 2007/0169084 A1 | 7/2007 | Frank et al. | |
| 2010/0223625 A1* | 9/2010 | Smith | G06F 1/3209 719/317 |
| 2012/0265036 A1* | 10/2012 | Estes | G01N 27/3274 600/309 |
| 2013/0254842 A1* | 9/2013 | Jang | H04L 63/0884 726/3 |
| 2014/0115672 A1 | 4/2014 | Wood et al. | |

OTHER PUBLICATIONS

Android Developer, "DevicePolicyManager", <http://developer.android.com/reference/android/app/admin/DevicePolicyManager.html>, retrieved on May 12, 2015, 33 pages.

Global Platform, "Specifications", retrieved from <http://web.archive.org/web/20150321104756/http://www.globalplatform.org/specificationsdevice.asp> on May 12, 2015, 3 pages.

Microsoft, "Configure devices", MSDN Library, <https://msdn.microsoft.com/en-us/library/dn499730(d=printer).aspx>, Jan. 23, 2015, 2 pages.

\* cited by examiner

SECURE TRUSTED EXECUTION ENVIRONMENT DATA STORE

TECHNICAL FIELD

Embodiments generally relate to the management and storage of factory data in computing platforms. More particularly, embodiments relate to secure trusted execution environment data stores.

BACKGROUND

During manufacture, mobile platforms may be provisioned with factory data such as calibration results, wherein the calibration results may ensure the proper operation of cameras, modems, sensors, network controllers and other devices installed on the mobile platform. The operating system (OS) of the mobile platform may generally control and manage the storage of the factory data to non-volatile memory (NVM) on the mobile platform according to provisioning formats that are specific to the OS in question. For example, certain operating systems may use logical partitions to maintain the factory data in shared NVM, whereas other operating systems may use physical partitions such as Serial Peripheral Interface NOR (SPINOR) memory or embedded MultiMediaCard (eMMC) memory to maintain the factory data. If, after shipment of the mobile platform to the wireless carrier, retailer and/or end user, the mobile platform is later re-configured to run a different OS, the factory data may be either lost or rendered untrustworthy due to the OS-specific nature of the data provisioning. As a result, downstream entities may be forced to choose between costly re-calibrations (e.g., in order to achieve satisfactory operation of the mobile platform) and foregoing OS migrations altogether.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
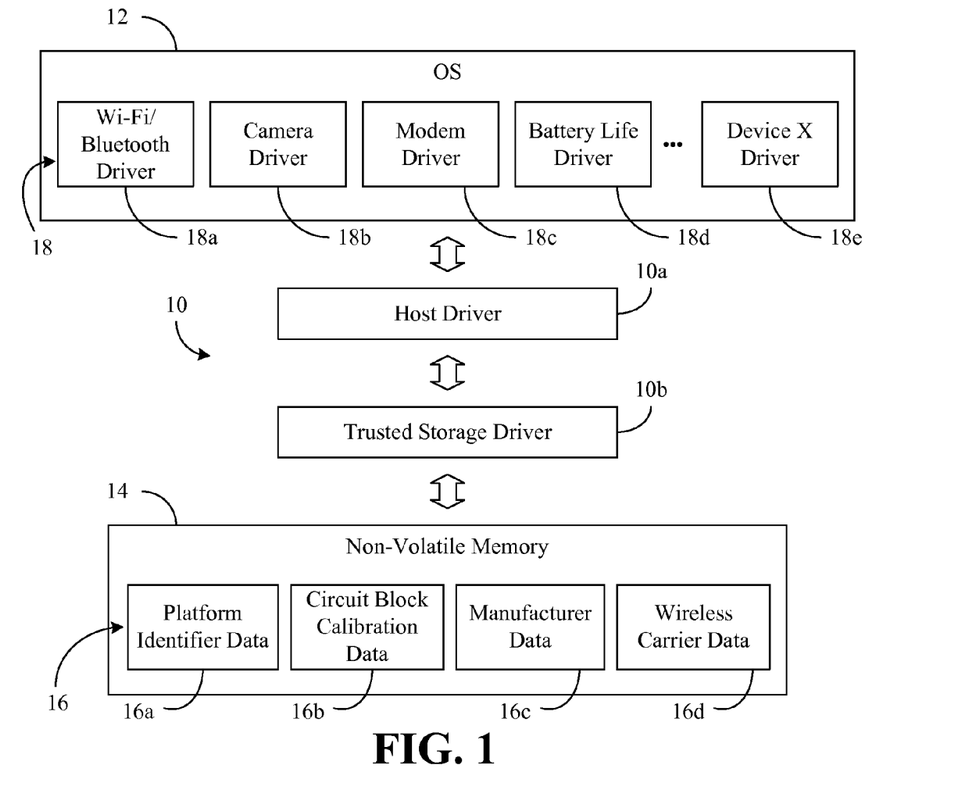
FIG. 1 is a block diagram of an example of a communications interface according to an embodiment.

Turning now to FIG. 1, an interface 10 (10a,10b) between an operating system (OS) 12 and a non-volatile memory (NVM) 14 is shown, wherein the NVM 14 may generally be provisioned with factory data 16 (16a-16d) such as, for example, platform identifier data 16a (e.g., international mobile station equipment identity/IMEI, subscriber identity module/SIM lock data, device identifier/DeviceID, stock keeping unit/SKU, media access control/MAC identifier, etc.), circuit block (e.g., intellectual property/IP block) calibration data 16b, manufacturer data 16c (e.g., original equipment manufacturer/OEM data), wireless carrier data 16d, and so forth. The NVM 14 may be permanently installed in a computing platform such as, for example, a mobile platform (e.g., notebook computer, tablet computer, smart phone, personal digital assistant/PDA, mobile Internet device/MID, wearable computer, media player, vehicle navigation system, etc.), stationary platform (e.g., desktop computer, kiosk, etc.), and so forth.

The OS 12 may run on the computing platform and include one or more device drivers 18 (18a-18e) such as, for example, a wireless driver 18a (e.g., Wi-Fi, Bluetooth), camera driver 18b, modem driver 18c, battery life driver 18d or other driver 18e (e.g., "Device X" driver) associated with various devices on the computing platform. The calibration data 16b, which may be associated with the device drivers 18, may ensure proper operation of the devices on the computing platform. As will be discussed in greater detail, the interface 10 may generally provide an OS independent solution to provisioning and maintaining the factory data 16 on the NVM 14. For example, the factory data 16 may be organized into various partitions based on the type of data as well as partitioned from other OS-specific data in the NVM 14. In the illustrated example, the interface 10 includes a host driver 10a (e.g., Global Platform Trusted Execution Environment application programming interface/API) that may reside on a host processor (not shown, e.g., central processing unit/CPU) and a trusted storage driver 10b that may reside on a root-of-trust apparatus (not shown, e.g., trusted execution environment), wherein the illustrated host driver 10a communicates with the OS 12 and the illustrated trusted storage driver 10b communicates with the NVM 14. In an alternative example, the trusted storage driver 10b may communicate with the NVM 14 via the host driver 10a (e.g., in a "single headed" architecture), as will be discussed in greater detail.

Thus, the OS 12 may be agnostic to the provisioning format being used by the trusted storage driver 10b. Indeed, the OS 12 may be installed after the factory data 16 has been provisioned on the NVM 14 and the computing platform has been shipped from the manufacturing facility. Using the interface 10 to provide an OS independent format for provisioning the factory data 16 on the NVM 14 may enable the OS 12 to be modified (e.g., migrated to a different type of OS, upgraded to a newer version, etc.), without concern over the factory data being either lost or rendered untrustworthy. Accordingly, the computing platform may more readily support "build-to-order" activities being conducted by downstream entities such as, for example, wireless carriers, retailers or end users.

Figure 2:
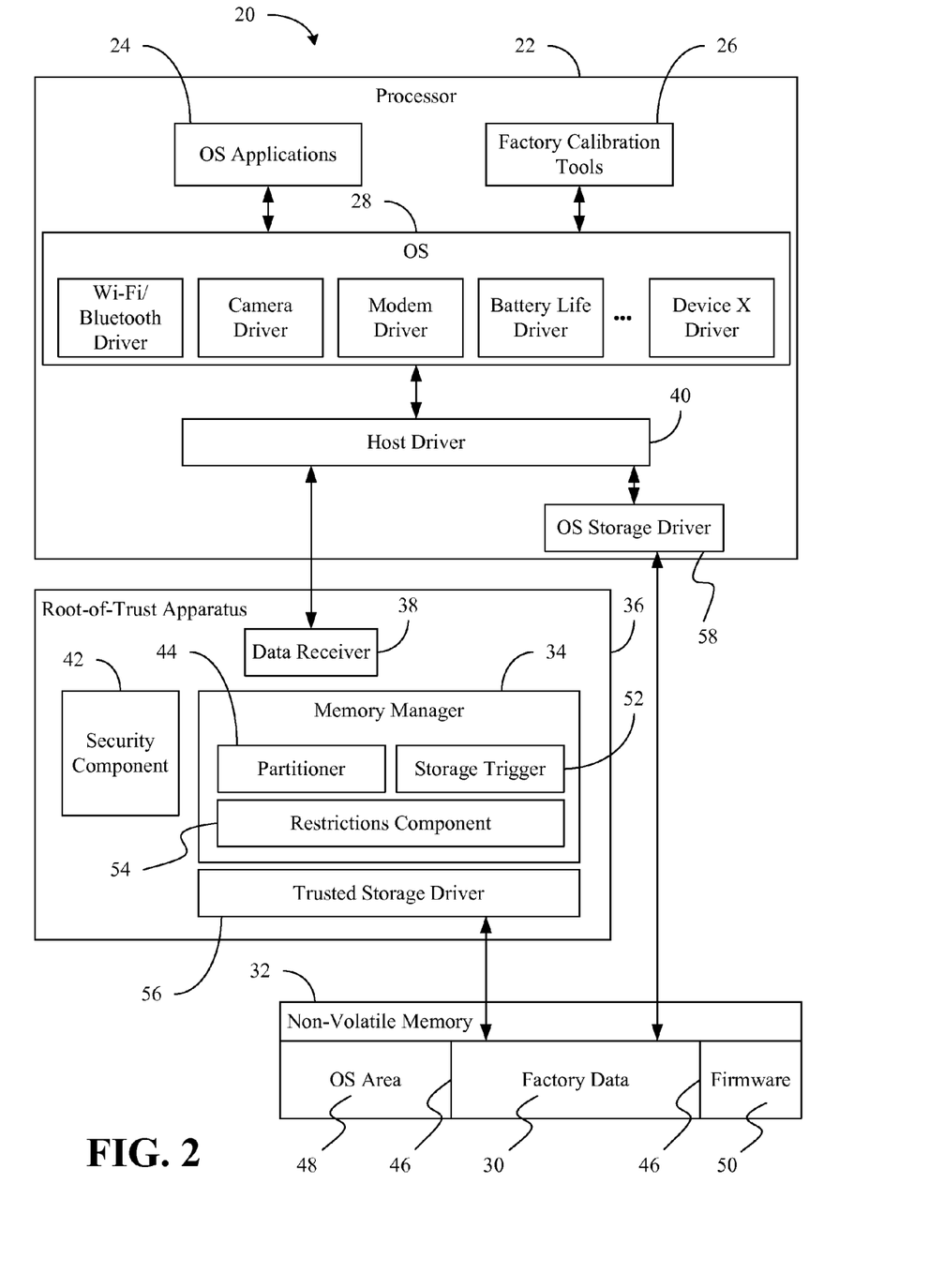
FIG. 2 is a block diagram of an example of a computing platform containing a root-of-trust apparatus according to an embodiment.

FIG. 2 shows a reconfigurable computing platform 20 such as, for example, a notebook computer, tablet computer, smart phone, PDA, MID, wearable computer, media player, vehicle navigation system, desktop computer, kiosk, and so forth. In the illustrated example, a processor 22 executes/runs one or more OS applications 24 and/or factory calibration tools 26, wherein the OS applications 24 and/or factory calibration tools 26 may coordinate with an OS 28 (e.g., mobile OS) in the generation of factory data 30. Alternatively, factory calibration tools 26 may generate some or all of the factory data 30 without the participation or presence of the OS 28 on the computing platform 20. The factory data 30, which may be similar to the factory data 16 (FIG. 1), already discussed, may generally be provisioned into NVM 32 by a memory manager 34 located in a root-of-trust apparatus 36 (e.g., trusted execution environment) in accordance with an OS independent format. The NVM 32 may include, for example, Serial Peripheral Interface NOR (SPINOR) memory, embedded MultiMediaCard (eMMC) memory, Universal Flash Storage (UFS), phase change memory, or other suitable memory structure.

More particularly, the root-of-trust apparatus 36 may include a data receiver 38 (e.g., inter-process communication/IPC component) to receive, from a host driver 40, the factory data 30, which may include calibration data, platform identifier data, manufacturer data, wireless carrier data, etc., or any combination thereof. A security component 42 may verify the integrity of the factory data 30 by, for example, inspecting credentials accompanying the factory data 30 in one or more messages from the host driver 40, conducting a challenge-response session with the host driver 40, and so forth. The memory manager 34 may therefore provision the factory data 30 into the NVM 32 in accordance with an OS independent format.

For example, the memory manager 34 may include a partitioner 44 to define one or more partitions 46 in the NVM 32. The illustrated partitions 46 specify boundaries between the factory data 30 and an OS area 48, as well as between the factory data 30 and other firmware 50, although other partition configurations may be used (e.g., between calibration data, platform identifier data, manufacturer data, wireless carrier data, and so forth). Of particular note is that the OS 28 may not be aware of the format used to partition the factory data 30. As a result, the OS 28 may be modified and/or replaced without concern over loss or corruption of the factory data 30.

The illustrated memory manager 34 also includes a storage trigger 52 to initiate storage of the factory data 30 into the NVM 32 along the one or more partitions 46. Additionally, a restrictions component 54 may specify a restriction profile for the one or more partitions 46, wherein the restriction profile may include, for example, read restrictions (e.g., read permitted, read not permitted), write restrictions (e.g., write permitted, write not permitted), time bound restrictions (e.g., write permitted for N days), location bound restrictions (e.g., write permitted at Y location), and so forth. Thus, some partitioned areas might be read only post manufacturing, while others may be read/write until the platform undergoes geographic localization, and others are read/write post manufacturing. Thus, the memory manager 34 may provide host access to the factory data 30 based on the restriction profile by enforcing the restriction profile on attempted accesses by the OS 28, the OS applications 24, the factory calibration tools 26 or other components of the processor 22 and/or computing platform 20. Moreover, the memory manager 34 may maintain the factory data 30 in the NVM 32 along the one or more partitions 46 across/throughout OS updates that impact the OS area 48, firmware updates that impact the firmware 50, and so forth.

In one example, the root-of-trust apparatus 36 includes a trusted storage driver 56, wherein the factory data 30 is provisioned into the NVM 32 as downstream storage data via the trusted storage driver 56. Thus, the storage trigger 52 may communicate with the trusted storage driver 56 in order to initiate storage of the factory data 30. Such an approach may be considered a "dual headed" architecture to the extent that both the root-of-trust apparatus 36 and the processor 22 may access the NVM 32.

In another example, the security component 42 may sign the factory data 30, along with partition data defining the partitions 46 and restriction profile data to obtain upstream storage data. The security component 42 may then encrypt the upstream storage data and send (e.g., via a kernel mode that is only OS callable) the encrypted upstream storage data to the host driver 40, wherein the encrypted upstream storage data is provisioned into the NVM 32 via the host driver 40. More particularly, the host driver 40 may decrypt the upstream storage data and verify the signature. If the signature is validated, the host driver 40 may use an OS storage driver 58 to store the factory data 30 to the NVM 32. Such an approach may be considered a single headed architecture to the extent that only the processor 22 may access the NVM 32.

Figure 3:
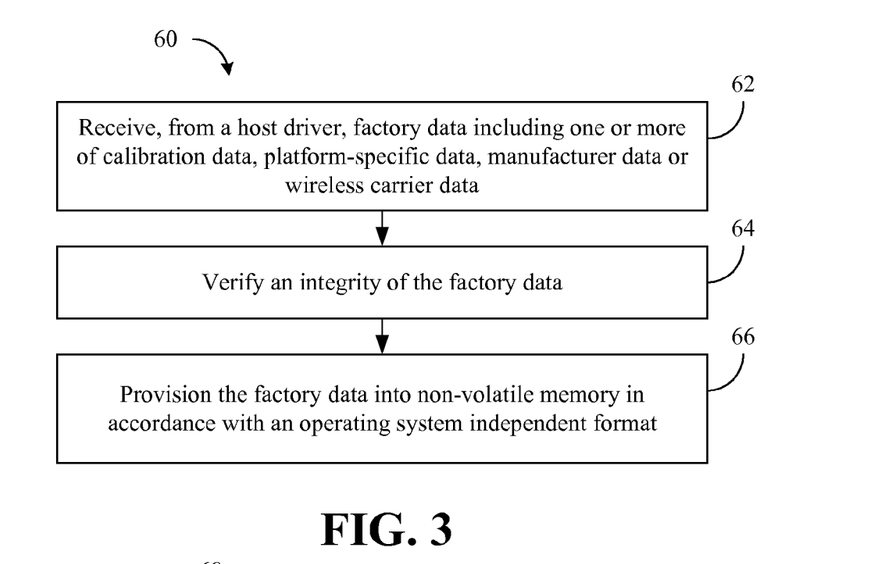
FIG. 3 is a flowchart of an example of a method of operating a root-of-trust apparatus according to an embodiment.

Turning now to FIG. 3, a method 60 of operating a root-of-trust apparatus is shown. The method 60 may generally be implemented in a root-of-trust apparatus such as, for example, the root-of trust apparatus 36 (FIG. 1), already discussed. More particularly, the method 60 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 60 may be written in any combination of one or more programming languages, including an object oriented programming language such as C#, JAVA or the like.

Illustrated processing block 62 provides for receiving, from a host driver, factory data including one or more of calibration data, platform identifier data, manufacturer data or wireless carrier data, wherein an integrity of the factory data may be verified at block 64. Block 66 may provision the factory data into non-volatile memory (NVM) in accordance with an operating system independent format.

Figure 4:
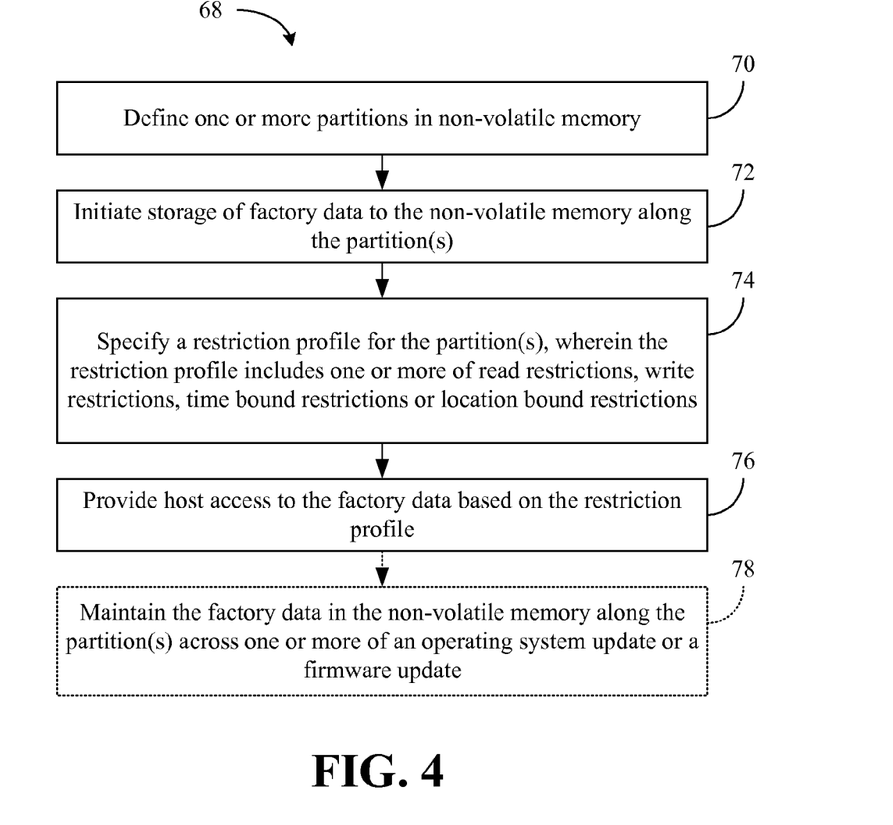
FIG. 4 is a flowchart of an example of a method of provisioning factory data into non-volatile memory according to an embodiment.

FIG. 4 shows a method 68 of provisioning factory data into NVM in accordance with an OS independent format. The method 68 may therefore be readily substituted for block 66 (FIG. 3), already discussed. The method 60 may also be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 70 provides for defining one or more partitions in NVM, wherein block 72 may initiate storage of factory data to the NVM along the partitions. Additionally, a restriction profile may be specified for the one or more partitions at block 74, wherein the restriction profile includes one or more of read restrictions, write restrictions, time bound restrictions, location bound restrictions, and so forth. Host access to the factory data may be provided at block 76 based on the restriction profile. Moreover, illustrated block 78 optionally maintains the factory data in the NVM along the partitions across one or more of an OS update or a firmware update. The OS update might include, for example, a migration from a first type of OS to a second type of OS, and upgrade of the OS from an earlier version to a newer version, etc. The firmware update may also include a firmware migration or upgrade.

Figure 5:
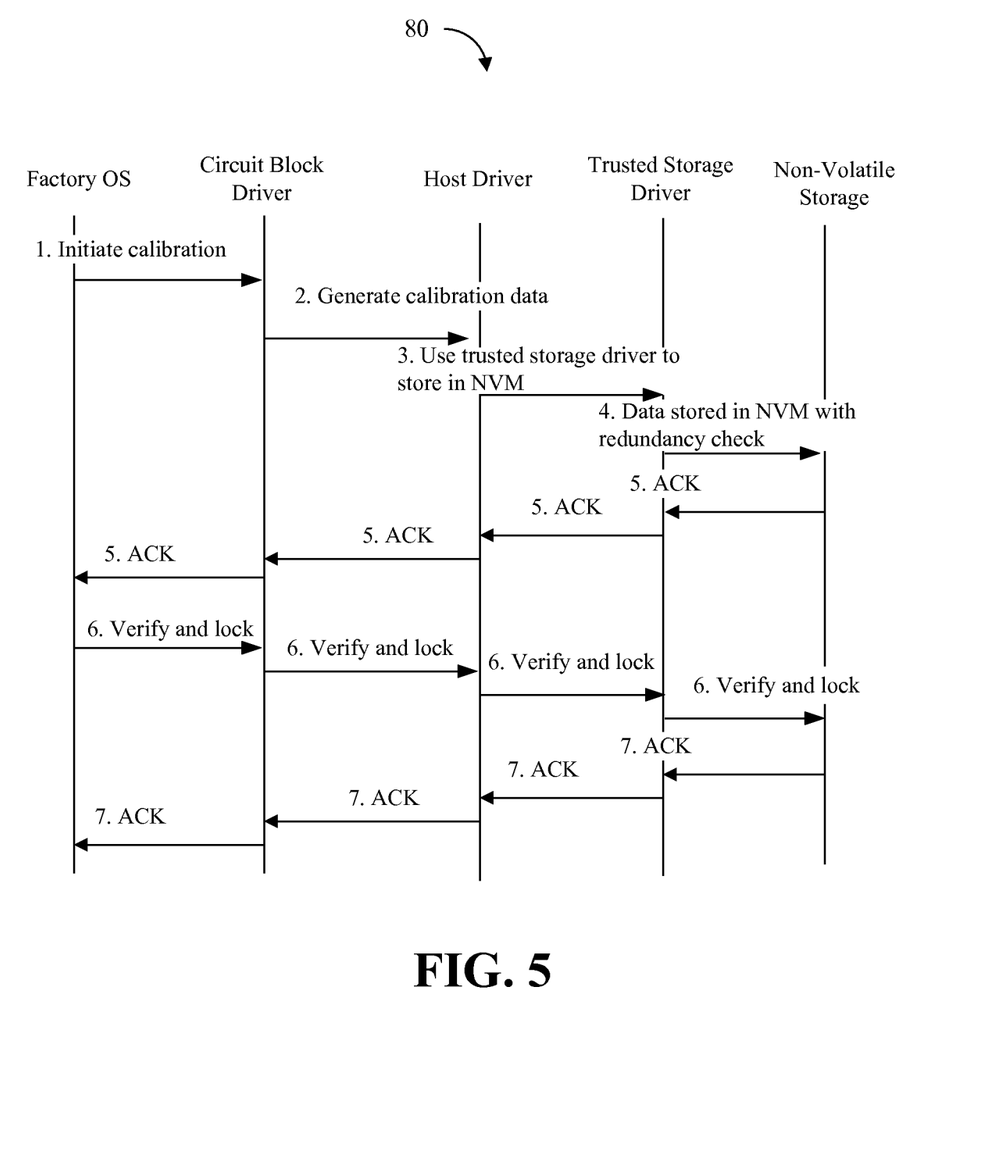
FIG. 5 is an illustration of an example of an operational flow according to an embodiment.

FIG. 5 shows one example of an operational flow 80 in which a factory OS initiates a circuit block calibration. In the illustrated example, the factory OS initiates calibration, the circuit block driver generates calibration data, the host driver uses the trusted storage driver to store the calibration data in NVM and the trusted storage driver stores the data in NVM with a redundancy check. The participating components may then cascade an acknowledgement (ACK) back to the factory OS, which may in turn initiate a verification and lock of the NVM. Upon completion of the verification and lock, the participating components may again cascade an ACK back to the factory OS.

Figure 6:
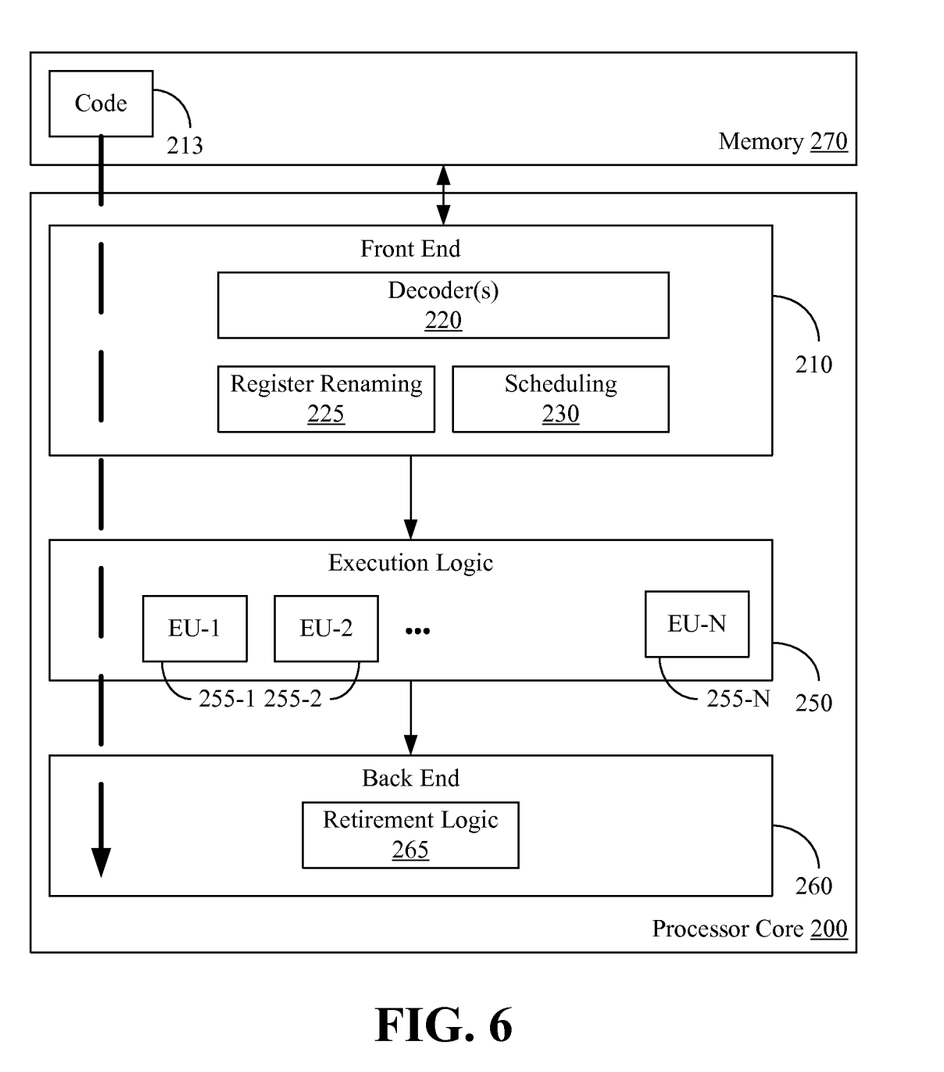
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 60 (FIG. 3) and/or the method 68 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 7:
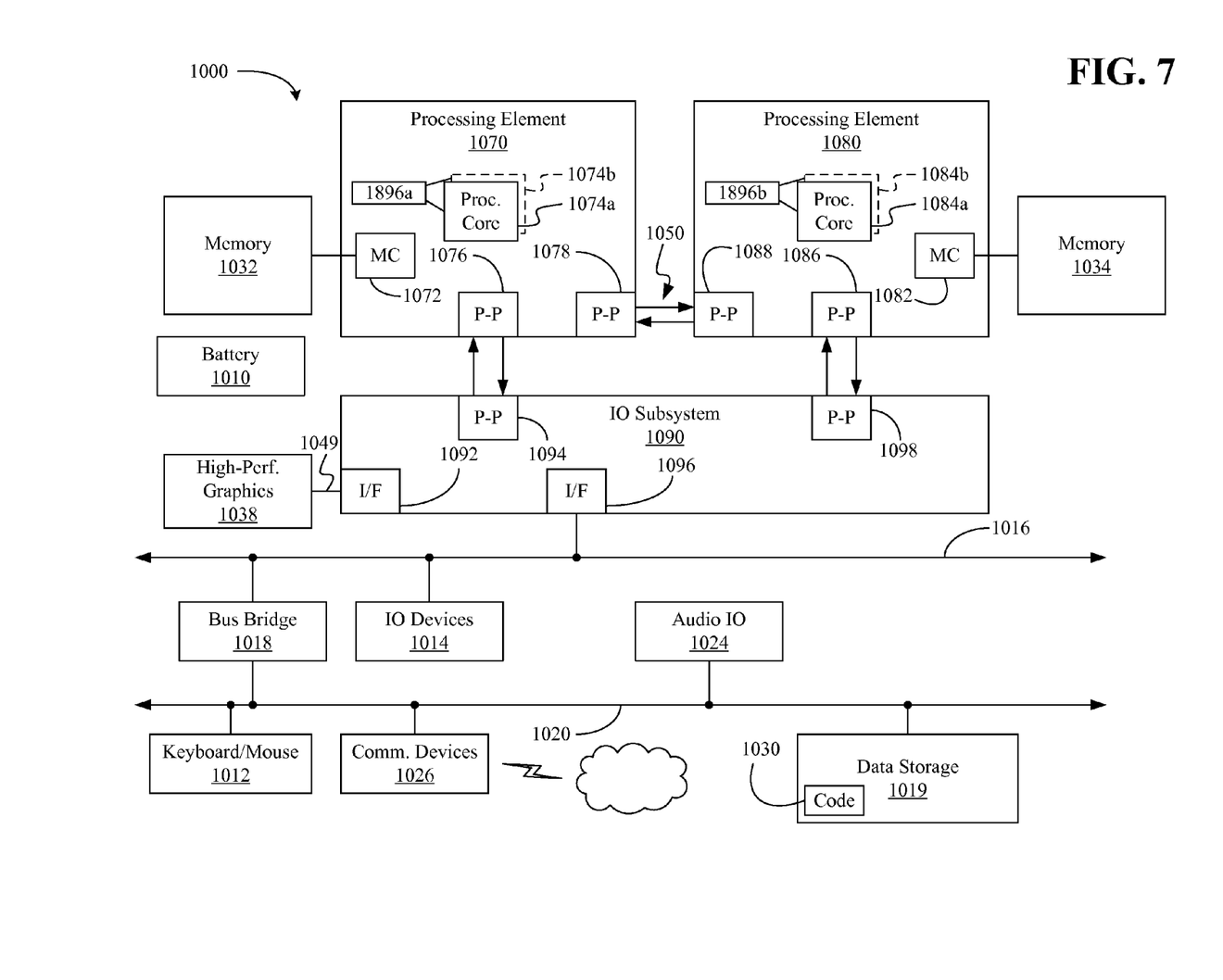
FIG. 7 is a block diagram of an example of a system according to an embodiment.

Referring now to FIG. 7, shown is a block diagram of a system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P)

interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 60 (FIG. 3) and/or the method 68 (FIG. 4), already discussed, and may be similar to the code 213 (FIG. 6), already discussed. Further, an audio I/O 1024 may be coupled to second bus 1020.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7. Moreover, the network controllers/communication device(s) 1026 may be implemented as a HFI (host fabric interface), also known as NIC (network interface card), that is integrated with one or more of the processing elements 1070, 1080 either on the same die, or in the same package.

Additional Notes and Examples

Example 1 may include a reconfigurable computing platform comprising a non-volatile memory, a host processor including one or more device drivers and a host driver, and a root-of-trust apparatus including a data receiver to receive, from the host driver, factory data including one or more of calibration data associated with the one or more device drivers, platform identifier data, manufacturer data or wireless carrier data, a security component to verify an integrity of the factory data, and a memory manager to provision the factory data into the non-volatile memory in accordance with an operating system independent format.

Example 2 may include the platform of Example 1, wherein the memory manager includes a partitioner to define one or more partitions in the non-volatile memory, a storage trigger to initiate storage of the factory data to the non-volatile memory along the one or more partitions, and a restrictions component to specify a restriction profile for the one or more partitions, wherein the restriction profile is to include one or more of read restrictions, write restrictions, time bound restrictions or location bound restrictions.

Example 3 may include the platform of Example 2, wherein the memory manager is to provide host access to the factory data based on the restriction profile.

Example 4 may include the platform of Example 2, wherein the memory manager is to maintain the factory data in the non-volatile memory along the one or more partitions across one or more of an operating system update or a firmware update.

Example 5 may include the platform of any one of Examples 1 to 4, wherein the root-of-trust apparatus is a trusted execution environment that includes a trusted storage driver and the factory data is to be provisioned into the non-volatile memory as downstream storage data via the trusted storage driver.

Example 6 may include the platform of any one of Examples 1 to 4, wherein the security component is to sign the factory data, partition data and restriction profile data to obtain upstream storage data, encrypt the upstream storage data, and send the encrypted upstream storage data to the host driver, and wherein the encrypted upstream storage data is to be provisioned into the non-volatile memory via the host driver.

Example 7 may include a root-of-trust apparatus comprising a data receiver to receive, from a host driver, factory data including one or more of calibration data, platform identifier data, manufacturer data or wireless carrier data, a security component to verify an integrity of the factory data, and a memory manager to provision the factory data into non-volatile memory in accordance with an operating system independent format.

Example 8 may include the apparatus of Example 7, wherein the memory manager includes a partitioner to define one or more partitions in the non-volatile memory, a storage trigger to initiate storage of the factory data to the non-volatile memory along the one or more partitions, and a restrictions component to specify a restriction profile for the one or more partitions, wherein the restriction profile is to include one or more of read restrictions, write restrictions, time bound restrictions or location bound restrictions.

Example 9 may include the apparatus of Example 8, wherein the memory manager is to provide host access to the factory data based on the restriction profile.

Example 10 may include the apparatus of Example 8, wherein the memory manager is to maintain the factory data in the non-volatile memory along the one or more partitions across one or more of an operating system update or a firmware update.

Example 11 may include the apparatus of any one of Examples 7 to 10, wherein the root-of-trust apparatus is a trusted execution environment that includes a trusted storage driver, wherein the factory data is to be provisioned into the non-volatile memory as downstream storage data via the trusted storage driver.

Example 12 may include the apparatus of any one of Examples 7 to 10, wherein the security component is to sign the factory data, partition data and restriction profile data to obtain upstream storage data, encrypt the upstream storage data, and send the encrypted upstream storage data to the host driver, and wherein the encrypted upstream storage data is to be provisioned into the non-volatile memory via the host driver.

Example 13 may include a method of operating a root-of-trust apparatus comprising receiving, from a host driver, factory data including one or more of calibration data, platform identifier data, manufacturer data or wireless carrier data, verifying an integrity of the factory data, and provisioning the factory data into non-volatile memory in accordance with an operating system independent format.

Example 14 may include the method of Example 13, wherein provisioning the factory data includes defining one or more partitions in the non-volatile memory, initiating storage of the factory data to the non-volatile memory along the one or more partitions, and specifying a restriction profile for the one or more partitions, wherein the restriction profile includes one or more of read restrictions, write restrictions, time bound restrictions or location bound restrictions.

Example 15 may include the method of Example 14, further including providing host access to the factory data based on the restriction profile.

Example 16 may include the method of Example 14, further including maintaining the factory data in the non-volatile memory along the one or more partitions across one or more of an operating system update or a firmware update.

Example 17 may include the method of any one of Examples 13 to 16, wherein the factory data is provisioned into the non-volatile memory as downstream storage data via a trusted storage driver.

Example 18 may include the method of any one of Examples 13 to 16, further including signing the factory data, partition data and restriction profile data to obtain upstream storage data, encrypting the upstream storage data, and sending the encrypted upstream storage data to the host driver, wherein the encrypted upstream storage data is provisioned into the non-volatile memory via the host driver.

Example 19 may include at least one computer readable storage medium comprising a set of instructions, which when executed by a computing platform, cause the computing platform to receive, from a host driver, factory data including one or more of calibration data, platform identifier data, manufacturer data or wireless carrier data, verify an integrity of the factory data, and provision the factory data into non-volatile memory in accordance with an operating system independent format.

Example 20 may include the at least one computer readable storage medium of Example 19, wherein the instructions, when executed, cause the computing platform to define one or more partitions in the non-volatile memory, initiate storage of the factory data to the non-volatile memory along the one or more partitions, and specify a restriction profile for the one or more partitions, wherein the restriction profile includes one or more of read restrictions, write restrictions, time bound restrictions or location bound restrictions.

Example 21 may include the at least one computer readable storage medium of Example 20, wherein the instructions, when executed, cause the computing platform to provide host access to the factory data based on the restriction profile.

Example 22 may include the at least one computer readable storage medium of Example 20, wherein the instructions, when executed, cause the computing platform to maintain the factory data in the non-volatile memory along the one or more partitions across one or more of an operating system update or a firmware update.

Example 23 may include the at least one computer readable storage medium of any one of Examples 19 to 22, wherein the factory data is to be provisioned into the non-volatile memory as downstream storage data via a trusted storage driver.

Example 24 may include the at least one computer readable storage medium of any one of Examples 19 to 22, wherein the instructions, when executed, cause the computing platform to sign the factory data, partition data and restriction profile data to obtain upstream storage data, encrypt the upstream storage data, and send the encrypted upstream storage data to the host driver, wherein the encrypted upstream storage data is to be provisioned into the non-volatile memory via the host driver.

Example 25 may include a root-of-trust apparatus comprising means for receiving, from a host driver, factory data including one or more of calibration data, platform identifier data, manufacturer data or wireless carrier data, means for verifying an integrity of the factory data, and means for provisioning the factory data into non-volatile memory in accordance with an operating system independent format.

Example 26 may include the apparatus of Example 25, wherein the means for provisioning the factory data includes means for defining one or more partitions in the non-volatile memory, means for initiating storage of the factory data to the non-volatile memory along the one or more partitions, and means for specifying a restriction profile for the one or more partitions, wherein the restriction profile is to include one or more of read restrictions, write restrictions, time bound restrictions or location bound restrictions.

Example 27 may include the apparatus of Example 26, further including means for providing host access to the factory data based on the restriction profile.

Example 28 may include the apparatus of Example 26, further including means for maintaining the factory data in the non-volatile memory along the one or more partitions across one or more of an operating system update or a firmware update.

Example 29 may include the apparatus of any one of Examples 25 to 28, wherein the factory data is to be provisioned into the non-volatile memory as downstream storage data via a trusted storage driver.

Example 30 may include the apparatus of any one of Examples 25 to 28, further including means for signing the factory data, partition data and restriction profile data to obtain upstream storage data, means for encrypting the upstream storage data, and means for sending the encrypted upstream storage data to the host driver, wherein the encrypted upstream storage data is to be provisioned into the non-volatile memory via the host driver.

Techniques described herein may therefore provide a persistent NVM storage scheme that is agnostic across updates and/or device repairs. Additionally, specific data may be identified, accessed and modified on NVM, while the OS remains independent, portable and scalable. As a result manufacturers may be able to provide Build-to-Order, reconfigurable computing platforms that more readily satisfy the demands of end users. Indeed, operating systems may be bound to computing platforms much later in the distribution chain under the techniques described herein.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A platform comprising:
   a non-volatile memory;
   a host processor including one or more device drivers and a host driver; and
   a root-of-trust apparatus including:
      a data receiver to receive, from the host driver, factory data including one or more of calibration data associated with the one or more device drivers, platform identifier data, manufacturer data or wireless carrier data, and further factory data;
      a security component to verify an integrity of the factory data, wherein the security component is to sign the factory data, partition data and restriction profile data to obtain upstream storage data, encrypt the upstream storage data, and send the encrypted upstream storage data to the host driver, and wherein the encrypted upstream storage data is provisioned into the non-volatile memory via the host driver; and
      a memory manager to provision the further factory data into the non-volatile memory in accordance with an operating system independent format, wherein host access is provided to one or more of the factory data or the further factory data across one or more of an operating system update, a firmware update, or a platform repair.

2. The platform of claim 1, wherein the memory manager includes one or more of:
   a partitioner to define one or more partitions in the non-volatile memory;
   a storage trigger to initiate storage of one or more of the factory data or the further factory data to the non-volatile memory along the one or more partitions; and
   a restrictions component to specify a restriction profile for the one or more partitions, wherein the restriction profile is to include one or more of read restrictions, write restrictions, time bound restrictions or location bound restrictions.

3. The platform of claim 2, wherein the host access to one or more of the factory data or the further factory data is provided based on the restriction profile.

4. The platform of claim 2, wherein one or more of the factory data or the further factory data is maintained in the non-volatile memory along the one or more partitions across one or more of the operating system update, the firmware update, or the platform repair.

5. The platform of claim 1, wherein the root-of-trust apparatus further includes a trusted storage driver, and wherein the further factory data is provisioned into the non-volatile memory as downstream storage data via the trusted storage driver.

6. An apparatus comprising:
   a data receiver to receive, from a host driver, factory data including one or more of calibration data, platform identifier data, manufacturer data or wireless carrier data, and further factory data;
   a security component to verify an integrity of the factory data, wherein the security component is to sign the factory data, partition data and restriction profile data to obtain upstream storage data, encrypt the upstream storage data, and send the encrypted upstream storage data to the host driver, and wherein the encrypted upstream storage data is provisioned into a non-volatile memory via the host driver; and
   a memory manager to provision the factory data into the non-volatile memory in accordance with an operating system independent format, wherein host access is provided to one or more of the factory data or the further factory data across one or more of an operating system update, a firmware update, or a platform repair.

7. The apparatus of claim 6, wherein the memory manager includes one or more of:
   a partitioner to define one or more partitions in the non-volatile memory;

a storage trigger to initiate storage of one or more of the factory data or the further factory data to the non-volatile memory along the one or more partitions; and a restrictions component to specify a restriction profile for the one or more partitions, wherein the restriction profile is to include one or more of read restrictions, write restrictions, time bound restrictions or location bound restrictions.

8. The apparatus of claim 7, wherein the host access to one or more of the factory data or the further factory data is provided based on the restriction profile.

9. The apparatus of claim 7, wherein one or more of the factory data or the further factory data is maintained in the non-volatile memory along the one or more partitions across one or more of the operating system update, the firmware update, or the platform repair.

10. The apparatus of claim 6, further including a trusted storage driver, wherein the further factory data is provisioned into the non-volatile memory as downstream storage data via the trusted storage driver.

11. A method comprising:
receiving, from a host driver, factory data including one or more of calibration data, platform identifier data, manufacturer data or wireless carrier data, and further factory data;
verifying an integrity of the factory data;
signing the factory data, partition data and restriction profile data to obtain upstream storage data;
encrypting the upstream storage data;
sending the encrypted upstream storage data to the host driver, wherein the encrypted upstream storage data is provisioned into a non-volatile memory via the host driver; and
provisioning the further factory data into the non-volatile memory in accordance with an operating system independent format, wherein host access is provided to one or more of the factory data or the further factory data across one or more of an operating system update, a firmware update, or a platform repair.

12. The method of claim 11, further including one or more of:
defining one or more partitions in the non-volatile memory;
initiating storage of one or more of the factory data or the further factory data to the non-volatile memory along the one or more partitions; and
specifying a restriction profile for the one or more partitions, wherein the restriction profile includes one or more of read restrictions, write restrictions, time bound restrictions or location bound restrictions.

13. The method of claim 12, further including providing host access to one or more of the factory data or the further factory data based on the restriction profile.

14. The method of claim 12, further including maintaining one or more of the factory data or the further factory data in the non-volatile memory along the one or more partitions across one or more of the operating system update, the firmware update, or the platform repair.

15. The method of claim 11, wherein the further factory data is provisioned into the non-volatile memory as downstream storage data via a trusted storage driver.

16. At least one non-transitory computer readable storage medium comprising a set of instructions, which when executed by a computing platform, cause the computing platform to:
receive, from a host driver, factory data including one or more of calibration data, platform identifier data, manufacturer data or wireless carrier data, and further factory data;
verify an integrity of the factory data;
sign the factory data, partition data and restriction profile data to obtain upstream storage data;
encrypt the upstream storage data;
send the encrypted upstream storage data to the host driver, wherein the encrypted upstream storage data is provisioned into a non-volatile memory via the host driver; and
provision the factory data into the non-volatile memory in accordance with an operating system independent format, wherein host access is provided to one or more of the factory data or the further factory data across one or more of an operating system update, a firmware update, or a platform repair.

17. The at least one computer readable storage medium of claim 16, wherein the instructions, when executed, cause the computing platform to one or more of:
define one or more partitions in the non-volatile memory;
initiate storage of one or more of the factory data or the further factory data to the non-volatile memory along the one or more partitions; and
specify a restriction profile for the one or more partitions, wherein the restriction profile includes one or more of read restrictions, write restrictions, time bound restrictions or location bound restrictions.

18. The at least one computer readable storage medium of claim 17, wherein the instructions, when executed, cause the computing platform to provide host access to one or more of the factory data or the further factory data based on the restriction profile.

19. The at least one computer readable storage medium of claim 17, wherein the instructions, when executed, cause the computing platform to maintain one or more of the factory data or the further factory data in the non-volatile memory along the one or more partitions across one or more of the operating system update, the firmware update, or the platform repair.

20. The at least one computer readable storage medium of claim 16, wherein the further factory data is provisioned into the non-volatile memory as downstream storage data via a trusted storage driver.

* * * * *